United States Patent [19]

Sosa et al.

[11] 4,379,972
[45] Apr. 12, 1983

[54] TURBINE VENTILATOR

[75] Inventors: Thomas J. Sosa, San Leandro, Calif.;
Daniel T. Sosa, 15576 Farnsworth
St., San Leandro, Calif. 94579

[73] Assignee: Daniel T. Sosa, San Leandro, Calif.

[21] Appl. No.: 266,663

[22] Filed: May 26, 1981

[51] Int. Cl.³ .............................................. F03D 9/00
[52] U.S. Cl. ........................................ 290/44; 290/55
[58] Field of Search ..................... 290/1, 2, 44, 52, 55;
415/2, 3; 416/197

[56] References Cited

U.S. PATENT DOCUMENTS

| | | | |
|---|---|---|---|
| 2,373,207 | 4/1945 | Touhey | 290/44 |
| 3,267,833 | 8/1966 | Artis et al. | 416/197 A X |
| 3,430,550 | 3/1969 | Smith et al. | 416/197 A X |
| 3,936,652 | 2/1976 | Levine | 290/55 X |
| 4,070,131 | 1/1978 | Yen | 290/55 X |
| 4,084,918 | 4/1978 | Paulecka | 290/55 X |
| 4,224,528 | 9/1980 | Argo | 290/55 |

*Primary Examiner*—J. V. Truhe
*Assistant Examiner*—W. E. Duncanson, Jr.

[57] ABSTRACT

This turbine ventilator is a combination device for ventilating a building structure, while it simultaneously generates useful current, and it consists primarily of a rooftop mounted housing, for confining rising warm air, and directing it into a pair of base members, which support rotating spherical members driven by the rising warm air. It further includes a shaft on each spherical member, which is coupled to secondary shafts with pulleys and belts, for driving a generator.

1 Claim, 3 Drawing Figures

U.S. Patent   Apr. 12, 1983   4,379,972
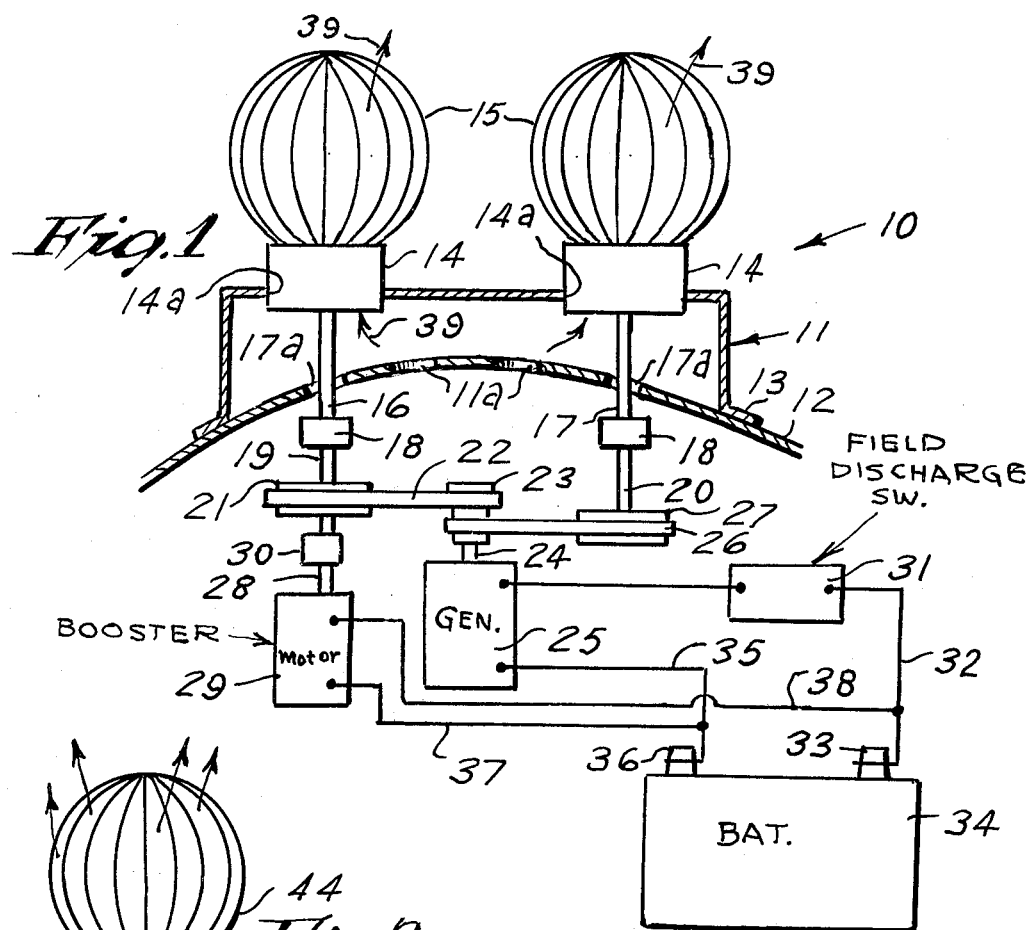
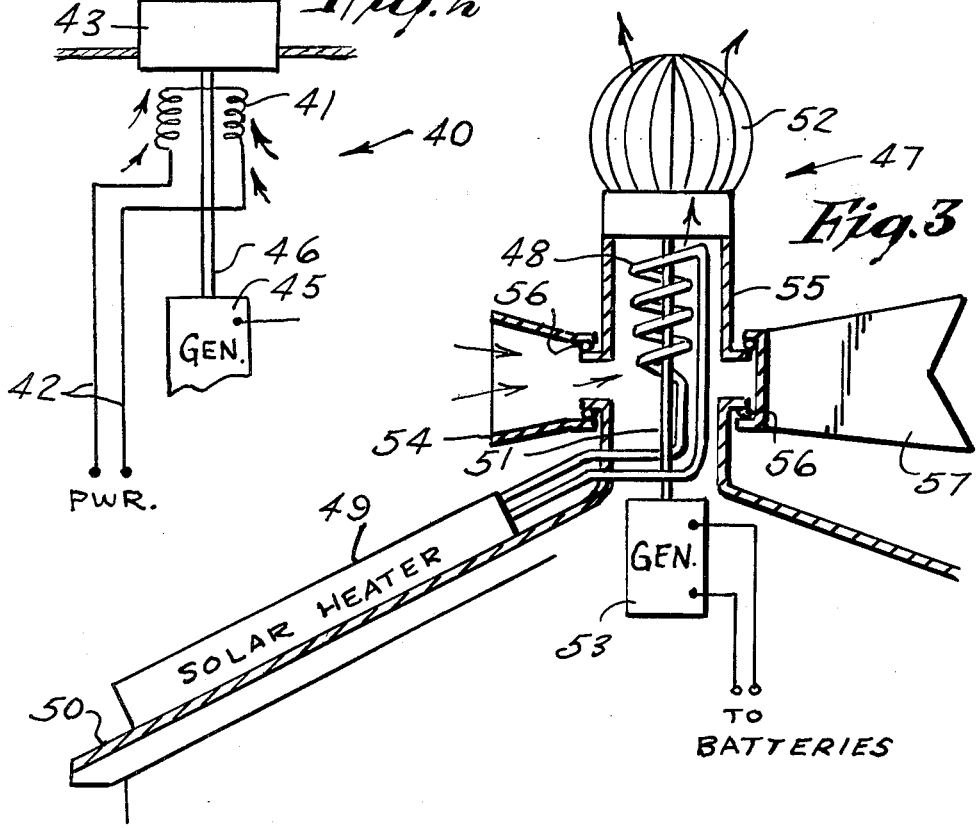

TURBINE VENTILATOR

This invention relates to electric current producing generators, and more particularly, to a turbine ventilator.

It is, therefore, the principal object of this invention to provide a turbine ventilator, which will be unique, in that it will be employed to generate electrical current.

Another object of this invention is to provide a turbine ventilator, which will be coupled to generator means, and battery means will be used to store current.

Another object of this invention is to provide a turbine ventilator, which will be roof-top mounted, so as to operate at maximum efficiency.

A further object of this invention is to provide a turbine ventilator, which will receive air in compartment means thereof, where it will expand and travel only through the ventilators, which are a pair, thus creating the rotary motion necessary for generating electricity.

A still further object of this invention is to provide a turbine ventilator, which will be adaptable for use on residential homes, as well as for a farm electric generating plant.

An even further object of this invention is to provide a turbine ventilator, which will be adaptable for use as an electric power plant, when used in plurality, and the device is economical and non-polluting in use.

Other objects of the present invention are to provide a turbine ventilator, which is simple in design, inexpensive to manufacture, rugged in construction, easy to use and efficient in operation.

These, and other objects, will be readily evident, upon a study of the following specification, and the accompanying drawing, wherein:

FIG. 1 is a diagrammatic side elevational view of the present invention;

FIG. 2 is similar to FIG. 1, but shows a fragmentary modified form, which illustrates a heating element, for heating the air to provide greater efficiency in the operation thereof, and FIG. 3 is similar to FIG. 2, and shows another modified form of the invention, which includes a solar collector, for supplying the heat for expanding the rising air.

According to this invention, a ventilator device 10 is shown to include a housing 11, which is secured to roof 12, in a suitable manner (not shown), by its flange 13. A pair of base members 14 are secured in openings 14 of housing 11, by suitable means (not shown), and a spherical air-driven member 15 is mounted in each of the base members 14, in a manner known in the art. The shafts 16 and 17, of base members 15, are freely and rotatably received in openings 17a, through roof 12, and each is secured to a self-aligning coupling 18 of their respective and aligned shafts 19 and 20. A pulley 21 is secured stationary to shaft 19, and an endless belt 22 is carried on pulley 21, and a pulley 23 secured to shaft 24 of generator 25. An endless belt 26 is carried on pulley 27 of shaft 20, and is also received on pulley 23, so as to drive generator 25, which is driven simultaneously, by means of pulley 21. Shaft 28, of booster 29, is secured to the lower end of shaft 19, by means of a suitable coupling 30.

It shall be noted, that the basic principle involved is that air enters into housing 11 by means of the openings 11a, and, when expanded, there is no place for it to go, except through members 15, thus creating the rotary motion that drives generator 25, etc.

A field discharge switch 31 is wired in series with line 32, which is connected to one side of generator 25, and to terminal 33 of battery 34, and the opposite side of generator 25 is connected, by wire 35, to terminal 36 of battery 34. The booster 29 is also connected to the terminals 33 and 36 of battery 34, by means of wires 37 and 38.

In use, air rises into the openings 11a, and flows through the bases 14 and members 15, as indicated by the arrows 39, the result being that members 15 rotate, and drive the generator 25 and booster 29, by means of the pulleys 21, 23 and 26. The current produced may be tapped off for any desired use, and the battery 34 is used to store current that is not used, which is common in the art.

Referring now to FIG. 2 of the drawing, an optional modified device 40 is shown to include a heating element 41, which is secured to a current source by wires 42, so as to heat the air rising into the base 43 and the spherical member 44, which drives the generator 45, by means of shaft 46.

In use, heating element 41 is directly below base 43 in housing 11, and provides for better expansion of air, for rotating member 44, when necessary.

Referring now to FIG. 3 of the drawing, another modified device 47 includes a hot water coil 48, which is secured in a solar collector 49, attached to the exterior of roof 50. Coil 48 encircles shaft 51, attached to the rotatable member 52 and generator 53, and air enters funnel 54 portion of housing 55. The funnel portion 54 is mounted on bearings 56 and a vane 57, on one side, serves as a means of holding the front end of funnel portion 54 into the wind for receiving air.

In use, air enters funnel 54 portion of housing 55, and solar heated water in coil 48 heats it, for greater expansion, as was heretofore described of the heating element 41 of device 40.

It shall be noted, that, since air has a tendency to flow downwards when cool, (then rises when warm), the need for wind driven generators with propellers is diminished, thus, by creating this kind of flow. The devices herein described can maintain a constant speed on the generating system, so that, even if enough electricity is generated, just to turn on the lights in an average residential home, the savings in electricity will be considerable.

It shall also be recognized, that a voltage regulator and a rheostat may be installed in the system, for control, as is common in the art, and the minimum elevation of the devices should be thirty feet, with proper ventilation below to take care of the atmospheric pressure, etc.

While various changes may be made in the detail construction, it is understood that such changes will be within the spirit and scope of the present invention, as is defined by the appended claims.

What we now claim is:

1. A turbine ventilator, comprising, in combination, a hollow housing mounted on top of an exterior surface of a building roof, opening means through said roof for rising hot air inside said building to enter said housing, a turbine on said housing, said turbine including a base through the top of said housing, and a rotatable spherical member thereupon rotated by said rising hot air, a downward rotor shaft from said spherical member providing electric generator driving means; a solar heater system including a solar collector upon said roof connected by water pipe to a hot water coil inside said housing and around an upper portion of said rotor shaft; a fresh air entry port around a side of said housing, said port being at an elevation that is lower than said water coil, and a rotatable collar around said port having a sidewardly extending vane and a funneled air intake opening on diametrically opposite sides of said collar.

* * * * *